United States Patent [19]
Terho et al.

[11] Patent Number: 6,119,180
[45] Date of Patent: *Sep. 12, 2000

[54] DATA TERMINAL WITH CONTROLLER FOR SELECTIVELY MODIFYING DATA TRANSMITTED TO AND FROM

[75] Inventors: Mikko Terho, Tampere; Marko Erkkila, Siuro; Simo Vapaakoski, Tampere, all of Finland

[73] Assignee: Nokia Mobile Phones, Ltd., Espoo, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 09/204,580

[22] Filed: Dec. 3, 1998

Related U.S. Application Data

[63] Continuation of application No. 08/634,701, Apr. 18, 1996, Pat. No. 5,884,103.

[30] Foreign Application Priority Data

May 3, 1995 [FI] Finland ..................................... 952107

[51] Int. Cl.⁷ ..................................................... G06F 13/00
[52] U.S. Cl. ............................. 710/72; 709/300; 710/62; 710/101; 710/126; 710/131; 375/222; 379/93.01
[58] Field of Search ............................. 710/2–39, 58–74, 710/101–103, 126–181; 485/484, 587, 588; 379/93, 93.01; 375/222; 709/300–308

[56] References Cited

U.S. PATENT DOCUMENTS

| | | |
|---|---|---|
| 5,428,671 | 6/1995 | Dykes et al. ............................... 379/93 |
| 5,532,939 | 7/1996 | Psinakis et al. ......................... 364/514 |
| 5,557,634 | 9/1996 | Balasubramaniam .................... 375/222 |
| 5,581,608 | 12/1996 | Jreij et al. ................................... 379/95 |
| 5,625,669 | 4/1997 | McGregor et al. ......................... 379/58 |
| 5,625,678 | 4/1997 | Blomfield-Brown ...................... 379/93 |
| 5,636,371 | 6/1997 | Yu ............................................. 395/500 |
| 5,675,831 | 10/1997 | Caputo ..................................... 395/830 |
| 5,678,059 | 10/1997 | Ramaswamy et al. .................. 395/821 |
| 5,715,474 | 2/1998 | Burke et al. ............................. 395/826 |
| 5,778,256 | 7/1998 | Davbee ................................... 395/892 |
| 5,797,041 | 8/1998 | Yasue et al. ............................. 395/872 |
| 5,805,636 | 9/1998 | Rao et al. ................................. 375/222 |
| 5,815,682 | 9/1998 | Williams et al. ........................ 395/500 |
| 5,835,862 | 11/1998 | Nykanen et al. ........................ 455/558 |
| 5,873,039 | 2/1999 | Najafi ....................................... 455/454 |
| 5,884,103 | 9/1999 | Terho et al. ............................... 710/72 |
| 5,903,849 | 5/1999 | Selin et al. ............................... 455/557 |
| 5,917,629 | 6/1999 | Hortensius ............................... 395/136 |

*Primary Examiner*—Christopher B. Shin
*Attorney, Agent, or Firm*—Perman & Green, LLP

[57] ABSTRACT

A data adapter functioning as an intermediary between a data terminal and a digital data transmission network is implemented by using the parts the data terminal usually comprises and by directing their activity by processor commands recorded in the memory of the data terminal.

20 Claims, 9 Drawing Sheets

DATA TERMINAL WITH CONTROLLER FOR SELECTIVELY MODIFYING DATA TRANSMITTED TO AND FROM

This is a continuation application based on the application for DATA ADAPTER under U.S. Ser. No. 08/634,701, filed on Apr. 18, 1996, now allowed U.S. Pat. No. 5,884,103, and based on which priority is claimed under all available laws and conventions.

BACKGROUND OF THE INVENTION

1. Field of the Invention

The invention relates to a method and equipment for transmitting and receiving data through a mobile station network by using a data terminal device, such as personal computer, connected to a digital mobile station via a standard serial port.

2. Description of the Prior Art

A traditional modem is an electronic device intended to adapt the different data transmission features of the terminal device and the telephone network to one another. These features can deviate from one another with respect to, e.g., the signal type (analog/digital), voltage level, speed of data transmission, and data protocols. The data transmission protocols here refer to the standardized methods applied by the devices participating in the data transmission for ensuring the operation and reliability of the communications. Error correction could be mentioned as an example of the data transmission protocols, for which the transmitting device adds supervisory signals to the data to be transmitted, according to any applicable standard. By comparing the received data with the supervisory signals, the receiver is capable of determining whether errors have occurred in the data transmission.

Figure 1:
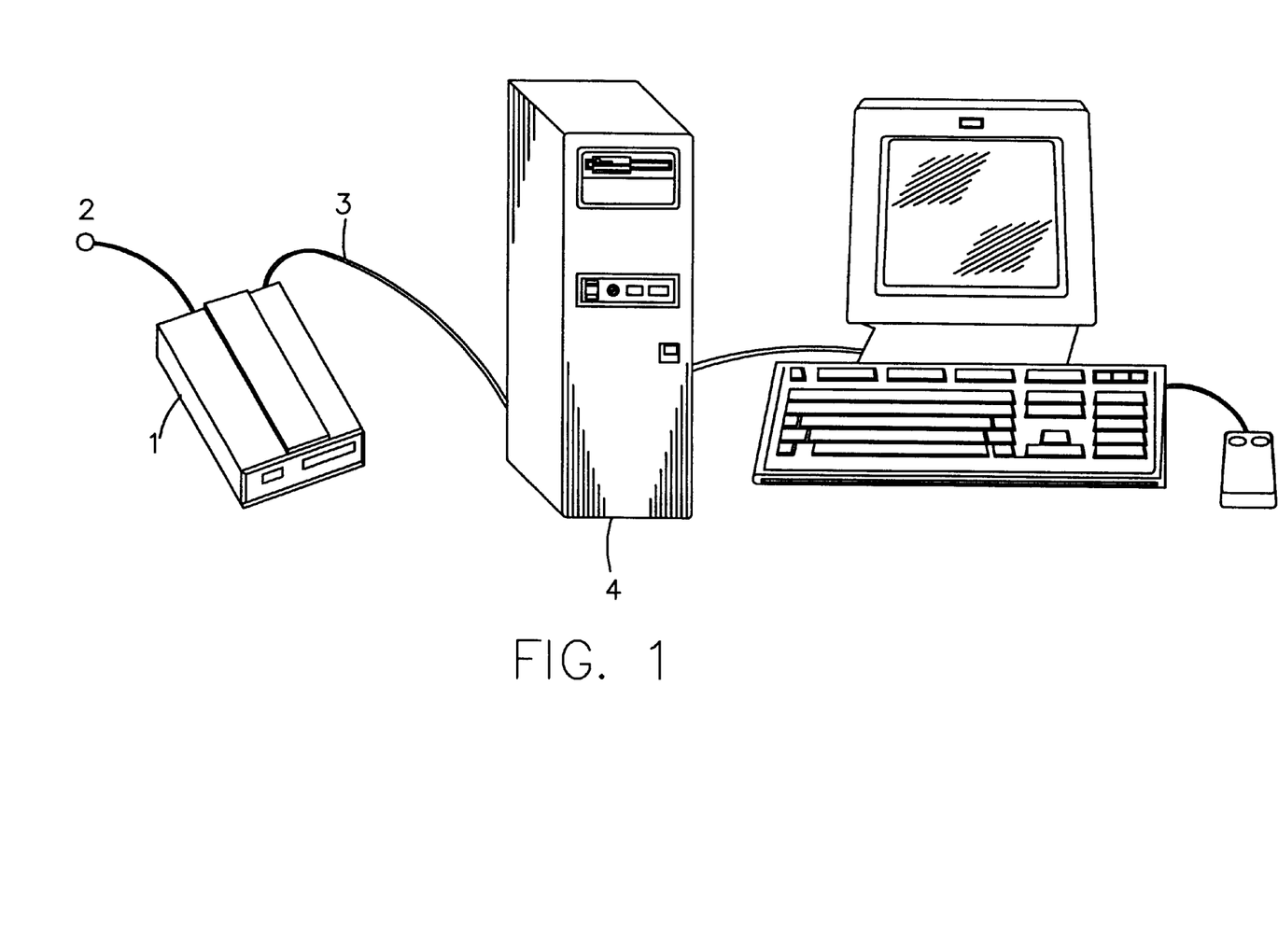
FIG. 1 presents the use of a computer and an external modem according to prior art in a fixed telephone network.
Figure 2:
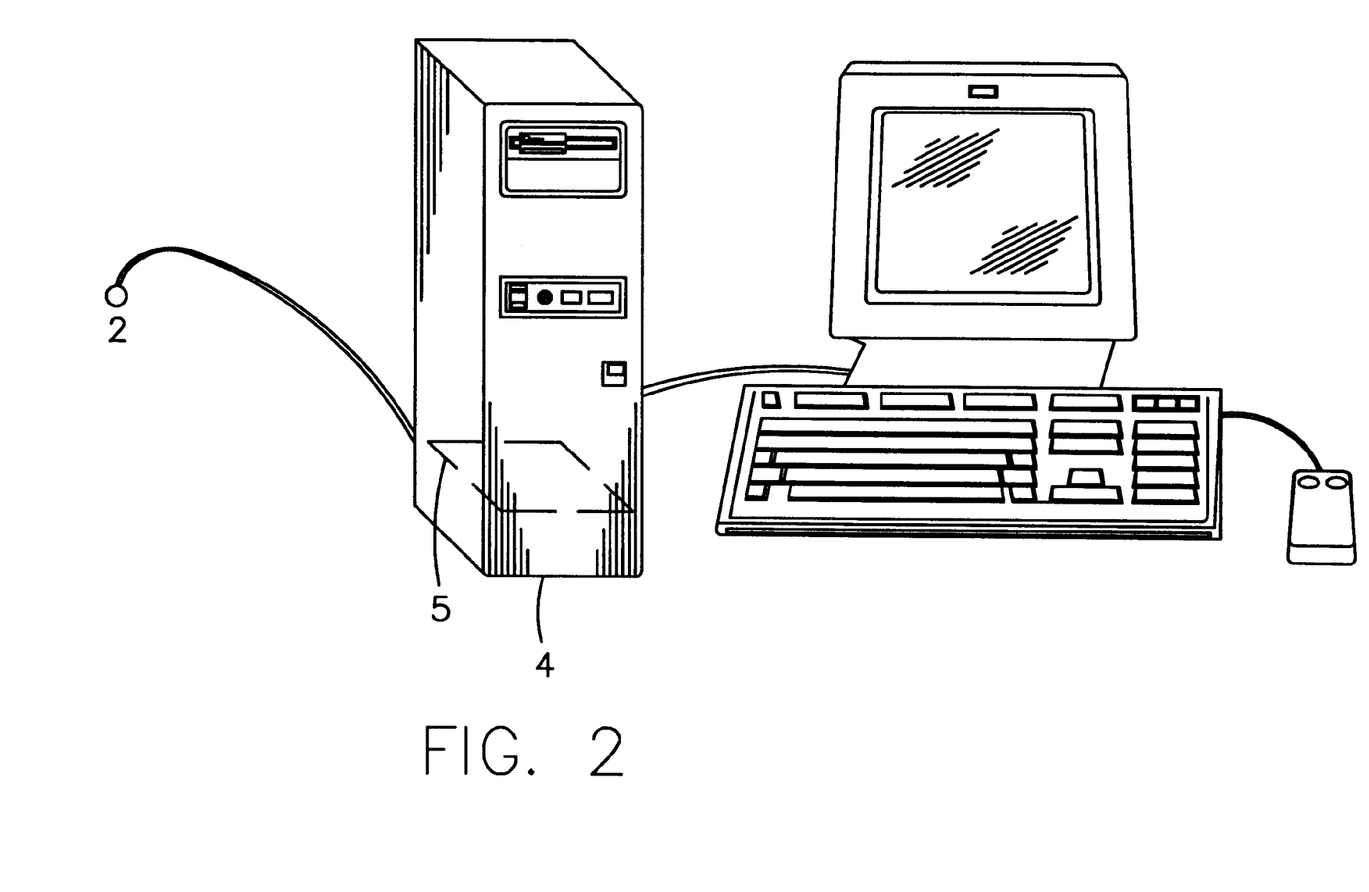
FIG. 2 presents the use of a computer and an internal modem (a card modem) according to prior art in the fixed telephone network.
Figure 3:
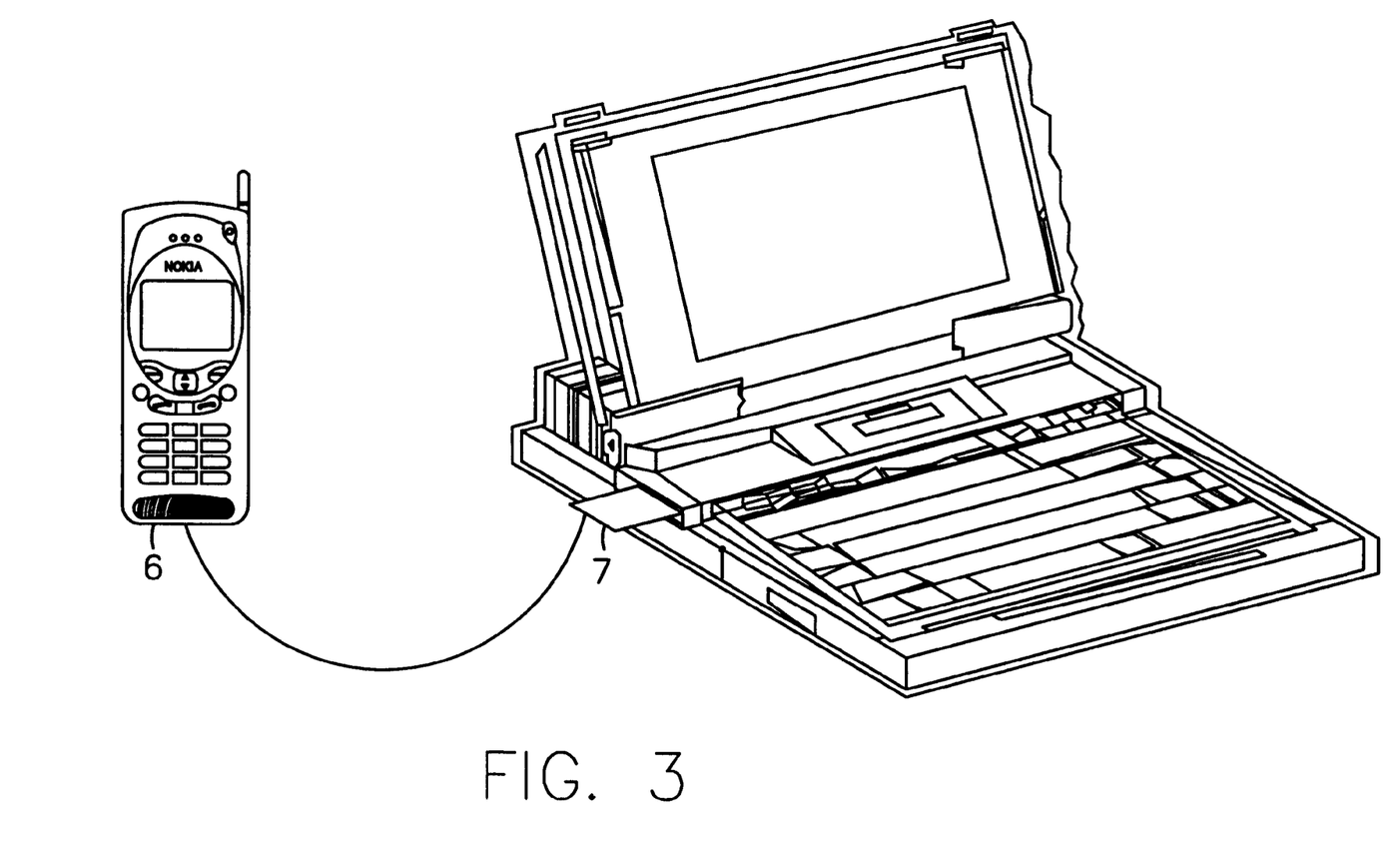
FIG. 3 presents the use of a portable computer, a PCMCIA data adapter, and a GSM telephone according to prior art in a digital mobile phone network.
Figure 4:
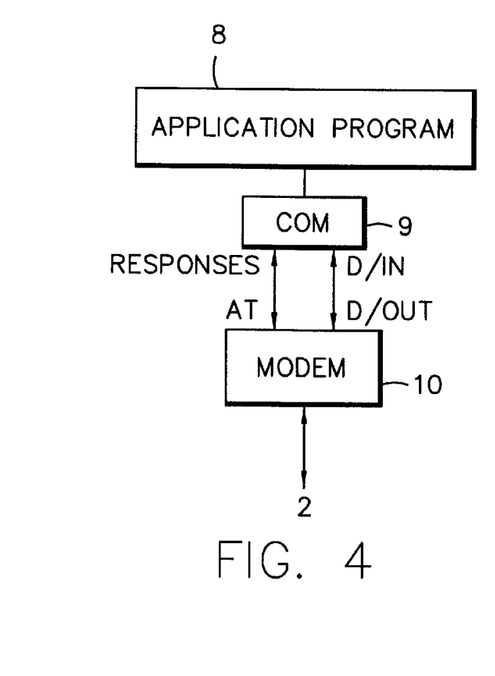
FIG. 4 presents a a block diagram of the interaction between a prior art modem and the application program operating in the computer.

The traditional modem is connected to the serial port of the terminal. The implementation of the device varies depending on which physical bus the device is connected to the terminal. A computer is herein handled as the terminal, by way of example, comprising an application program, such as a telefax program that uses a modem. According to FIG. 1 modem 1 can be an external device connected to the serial port of terminal 4 and to fixed telephone network 2 by using cable 3. So-called card modem 5 can also be connected directly to the internal bus of computer 4 (FIG. 2) or, especially in portable computers, to the PCMCIA connection (Personal Computer Memory Card International Association). The term "modem" refers to a device intended for communications in a fixed, analog telephone network in particular. Device 7 according to FIG. 3, implementing the tasks of the modem in a digital mobile phone network, is called data adapter. Since the present invention relates mainly to data transmission through a digital mobile phone network, the arrangement according to the invention for data transmission from the terminal to a mobile station operating in a mobile phone network is called a data adapter here. Independent of its physical mode of implementation, the computer handles the traditional modem or the data adapter in digital telephone networks as a serial port from the point of view of data transmission, i.e., as COM-port 9 in PCs (FIG. 4). FIG. 4 presents modem 10 as an example but the traditional data adapter communicates in a completely corresponding way with application program 8 of the computer, through serial port 9 (the COM-port in PCs). Directed by the application program, the computer writes outgoing data D/out into modem 10 and from there into telephone network 2, in the selected serial port 9, and reads incoming data D/in from the serial port. As a separate electronic device modem handles the transferred data and the terminal does not have access to the signal going from the modem to telephone network 2 or coming from the telephone network to the modem. The computer or corresponding terminal provides the modem or data adapter with operating commands and settings by using so-called AT-commands (AT in FIG. 4) by writing them that in serial port 9 in which modem 10 or the data adapter are visible. The responses to the commands given by the modem or the data adapter to the terminal can also be read in the serial port in question. For the writing and reading of the commands, modem 10 or the data adapter must be in the so-called command state, and the term AT-command is derived from the fact that, according to general practice, all the commands given to the modem or to the data adapter begin with letters AT.

Figure 5:
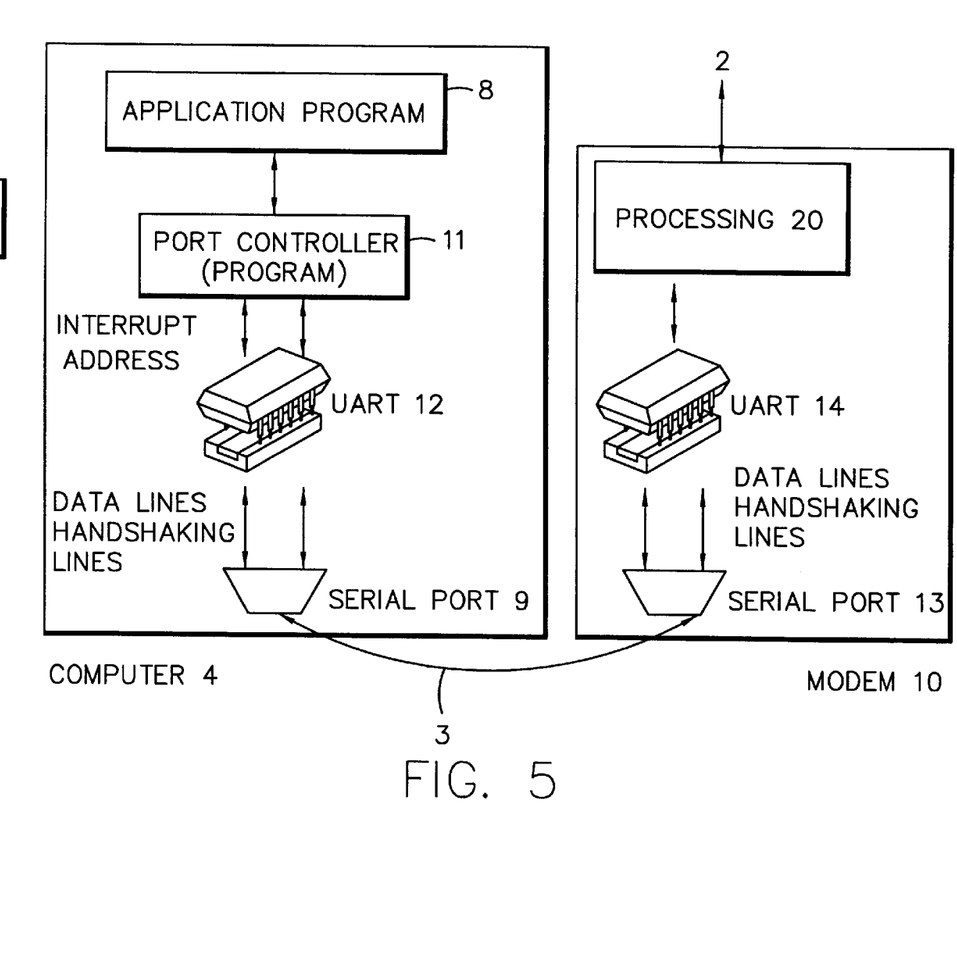
FIG. 5 presents the operation of the parts participating in the data transmission in the prior art computer and modem.
Figure 6:
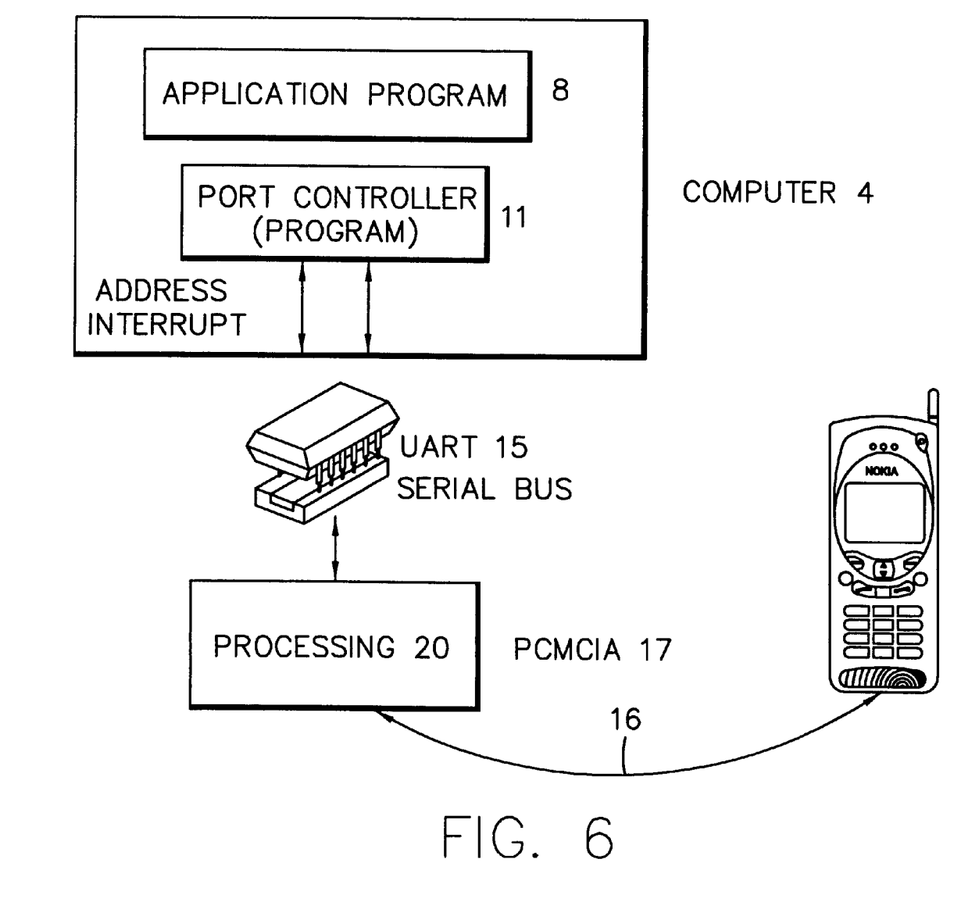
FIG. 6 presents in more detail the known data transmission equipment of FIG. 3, in which the GSM telephone is connected to the computer through the PCMCIA data adapter.

The processor of the computer does not communicate directly with physical port 9, controlled by application program 8, but port controller 11 is placed inbetween, implemented in the computer preferably as a port controller program (FIG. 5). Port controller 11 contains the data on which address of the memory space the UART-circuit 12 (Universal Asynchronous Receiver Transmitter) controlling the desired port is located in and which interrupt signal it uses, but the ordinary port controller does not process data going through it. There is a direct connection from UART-circuit 12 to the connector of serial port 9. The standard connector (e.g., RS-232) of the serial port comprises respective lines for incoming and outgoing asynchronous data and so-called handshake lines for controlling the data transmission. If the modem or data adapter 7 is connected, as in FIG. 6, to the internal bus of computer device 4 or to a PCMCIA connection, the transmitted and received data travels via UART-circuit 15 inside the modem or the data adapter, instead of the respective UART-circuit of the computer. In the case of FIG. 6, the tasks of the modem are handled by data adapter card 7 because the data transmission is effected in a digital mobile phone network.

Disadvantages of the traditional modem and data adapter are that it is a separate electronic device which must be acquired and installed in the computer before data can be transmitted through the telephone network. When installed, the modem or data adapter reserves one serial port and, in the case of the card modem an expansion slot, and in the case of the PCMCIA data adapter a PCMCIA interface, which, consequently, cannot be used with other auxiliary devices any more. Since the modem and the computer are generally not manufactured by the same company, different mechanical and electric tolerances and performance characteristics as well as actual factory defects can cause disturbance in the interworking of the computer and the modem, despite all standardization efforts.

The modem or data adapter generally contains adjustable selections or switches that have to be set properly before it is installed in the computer and that are difficult to modify. The structure and components of the modem can restrict its use in different operating modes, and if changes are made in the data transmission protocols, parts of the modem or even the whole modem might have to be replaced. The modem and telephone set have to be linked by a special cable which generally does not conform to any standard connections found in computers.

OBJECT OF THE INVENTION

The object of the present invention is to avoid the above-mentioned disadvantages related to the conventional modem or data adapter. The object is achieved by implementing the data adapter electrically by using the parts and components already existing in computers and by suitably directing their operation.

SUMMARY OF THE INVENTION

The method according to the invention is characterized in that the predetermined conversion of the transmitted data between the form of data processed by the application program controlling the operation of the data terminal and the form of data processed by the external device connected to the data terminal is effected in the device controller installed in the data terminal, which, in order to implement the data transmission, communicates with said application program through the communications controller controlling the internal data transmission of the data terminal, and with the port controller that connects with the said external device and controls the port, through the said communications controller.

The data terminal according to the invention is characterized in that it comprises a device controller for processing the transmitted data, the controller being in contact with said communications controller for transmitting data between said device controller and said application program, and between said device controller and said port controller.

The device controller according to the invention is characterized in that it is in contact with said communications controller to transmit data between said device controller and said application program, and between said device controller and said port controller.

BRIEF DESCRIPTION OF THE DRAWINGS

The invention is described in more detail in the following with reference to the appended figures in which.

The same reference numbers are used for corresponding parts in each figure.

DETAILED DESCRIPTION OF THE PREFERRED EMBODIMENT(S)

The data adapter according to the invention is essentially a device controller, with respect to the computer, more accurately a virtual serial port controller, and it is intended to be used in data transmission in digital mobile phone networks. The implementation of the data adapter according to the invention depends to some extent on the mobile phone system in which it is intended to be used. A data adapter intended for the GSM system (Group Speciale Mobile) is handled as an example in the following, but it is obvious to those skilled in the art that by replacing the parts and operations conforming to the GSM standards with parts and operations according to the standards of other mobile phone systems, a data adapter according to the invention and suitable for data transmission in other mobile phone networks can be provided. The data adapter according to the invention comprises some data transmission protocols of the mobile phone network defined for data services. The rest of the data transmission protocols are situated in the telephone and in the application program of the computer. The interfaces between the data adapter according to the invention and the rest of the computer are defined according to standards generally used in computers so that the other parts of the computer, such as the communications controller controlling the internal data transmission of the computer, can interwork with the data adapter according to the invention.

The structure and operation of the data adapter are described in the following, first, with respect to a situation in which the user of the terminal wants to transmit digital data through the mobile phone network to another terminal by using an application program in the terminal and the data adapter as well as a digital mobile phone. The characteristics of the present invention are illustrated by mentioning in particular those features and operations that distinguish the data adapter according to the invention from prior art. The data adapter according to prior art is marked with reference number 7 in the figures and the data adapter according to the invention with reference number 18.

Figure 8:
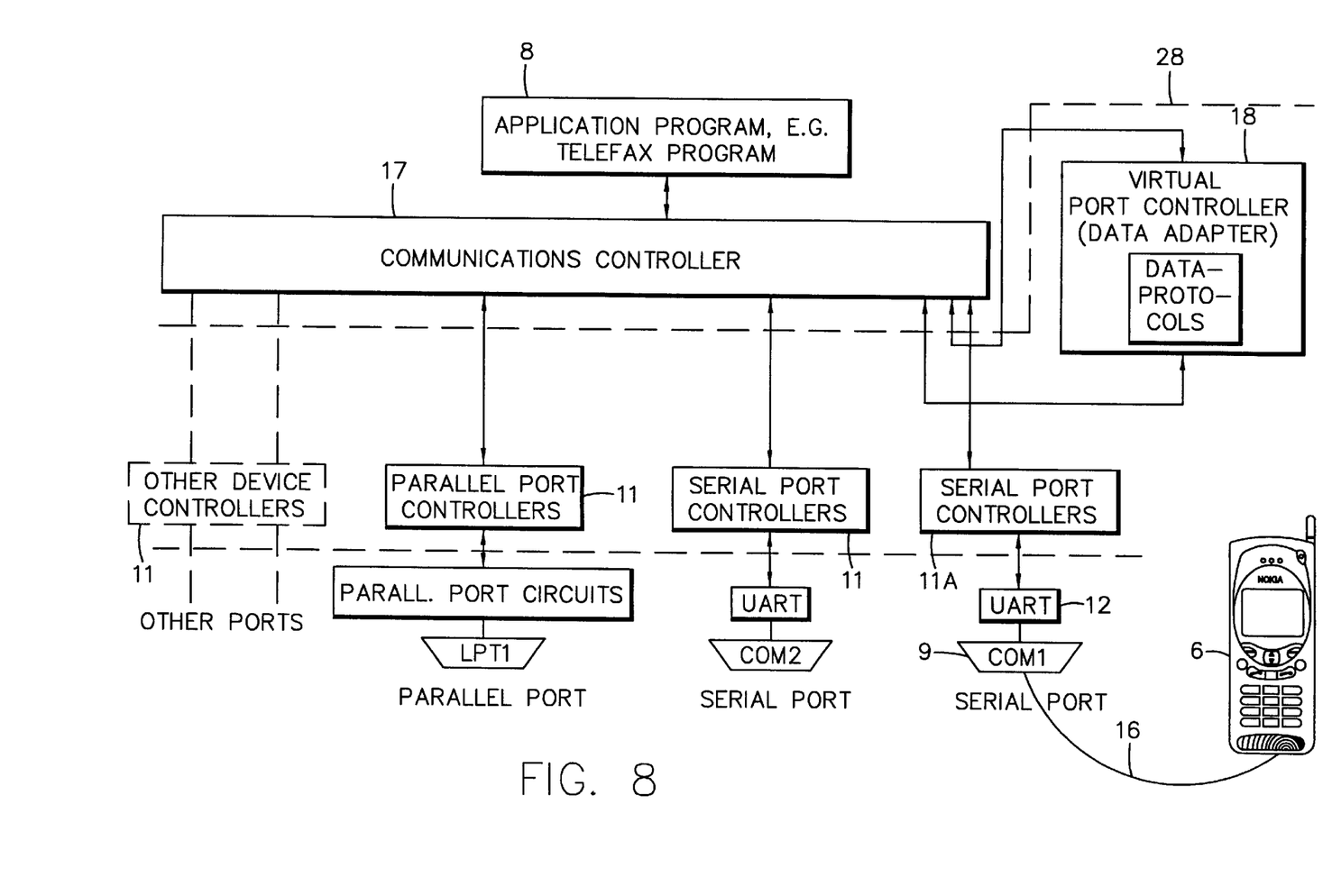
FIG. 8 illustrates the interworking of the data adapter according to the invention with the computer software and hardware.

Digital data is directed from the application program to the data adapter via a standardized call interface, which generally implies that the microprocessor (not shown in the figures) of the terminal equipment controlled by the application program writes the commands and data words intended for the data adaptor into a certain memory address. It is described above that in the solutions according to prior art both modem 1 and 5 and data adapter 7 are displayed as serial ports from the point of view of the terminal, i.e. as COM port 9 in PCs, therefore, the call interface is call interface 19 of a serial-form telecommunications port. The processor of the terminal writes the data to be transferred into a memory address that is set so that it directs the data bus of the computer into physically transferring the data to be processed in circuit 20 (FIG. 6) on a modem card or on the PCMCIA-card of the data adapter. In the solution according to the invention the processor (not shown in the figures) of the terminal writes the data, controlled by the application program, into a register or memory address from which it can retrieve and process it again, controlled by data adapter 18 according to the invention. The data control between application program 8 and data adapter 18 is handled by a special communications controller 17 (FIG. 8) which is preferably implemented by software and which is known per se, but whose operation is essential with respect to the invention and is therefore described in more detail below. The standardized register interface in this case is interface 28 for device controllers 11, 11a and 18, defined by the manufacturer of the communications controller program. The device controllers are placed below communications controller 17 in the hierarchy of the computer.

Figure 7A:
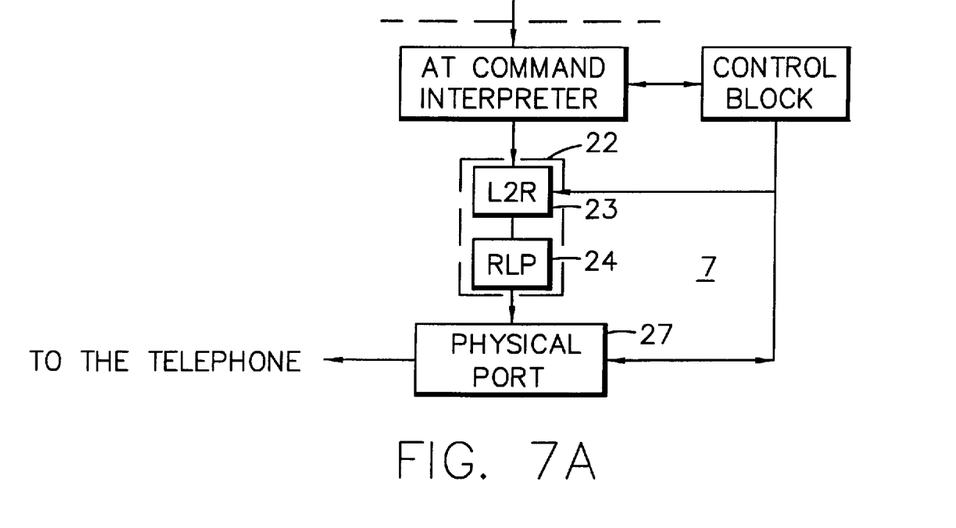
FIG. 7a presents a block diagram of the operation of the known modem or data adapter in data transmission.

All the modem and data adapter solutions comprise an AT command interpreter 21 which receives the character string that comes from the application program and whose task it is to determine whether the character string is a command or a data word to be transferred. In a situation such as in FIGS. 7a and 7b, the one being examined here, where the user wants to start a data transfer from a terminal to a mobile phone network, data adapter 7, 18 typically first receives from the application program the command "ATD123456", in which AT refers to a command, D is an abbreviation of the word "Dial", and 123456 represents the telephone number of an intended receiver. As a result of this command, the data adapter transmits a command to the mobile phone to select phone number 123456. In the arrangement according to the invention AT command interpreter 21 directs the command to control block 29 included in the data adapter, from where the command travels via communications controller 17, port controller 11a, physical port 9, and transmission cable 16 to mobile phone 6. The form of the command depends on the specifications made by the manufacturer of the mobile phone. The role of the communications controller, port controller and the physical port in data transmission are described below. The form of commands required by the mobile phone is a character string whose detailed structure is not essential with respect to the data adapter as long as it is known by the manufacturer of the data adapter so that the functions required in the production of the form of command can be included in the data adapter.

After data adapter 7, 18 has transmitted the dialling command to mobile phone 6, it waits for a message from the telephone indicating that a telephone call connection has been established. This type of a message, used by a part of the equipment to indicate that a task has been carried out, is called an OK-message below. When the telephone connection is in order, the data adapter conveys the OK-message from the telephone to application program 8. Thereafter, application program 8 starts to transfer data to be transmitted to the data adapter which shifts from a command state to a transmission state when the transmission starts. It was mentioned above that in solutions according to prior art, data is transferred physically to be processed by circuit 20 on a modem card or a PCMCIA data adapter card, whereby the transmission is carried out along the data bus of the computer one data word at a time according to the bus width and at the speed defined by the features of the bus. In the arrangement according to the invention the data transmission from the application program through standardized interface 28 to data adapter 18 according to the invention is essentially communication between the programmable processes functioning in the computer; therefore, the speed and the length of character strings transmitted in one go depend on the capacity and technical implementation of the processors (not shown in the figures) of the computer and on the load caused by the other processes of the computer.

The data to be transmitted, which comes from the application program, is directed by using data adapter 7, 18 to data protocol block 22 whose structure and operation depend on which mobile phone system the data adapter is intended to be used in. In this application we handle, as an example, a data adapter intended to be used in a GSM system, in which the data protocol block 22 comprises two subblocks called L2R (terminal adapter protocol, Layer 2 Relay Function) and RLP (Radio Link Protocol). The first of these, i.e., L2R block 23, arranges the data to be transmitted into Protocol Data Units, i.e., PDUs consisting of state octets, according to GSM standard 07.02. The PDUs are directed to RLP-block 24 one by one. There the data is formed into RLP frames according to GSM standard GSM 04.22, comprising a header part of 16 bits, an information part of 200 bits, and a frame check sequence, i.e., FCS, of 24 bits. The completed RLP frames are transferred to mobile phone 6, the digital signal processor (DSP, not shown in the figures) of which carries out a channel coding and interleaving according to the GSM system for the transmission. In the solution according to prior art the transmission to the mobile phone is effected by using the port controller and physical port 27 on the modem card or on the data adapter card. In the arrangement according to the invention the transfer is effected via communications controller 17, port controller 11a, and physical port 9 situated in the terminal.

After application program 8 has transferred all the data to be transmitted to data adapter 7, 18, and the call can be terminated, it informs the data adapter about this by using a so-called escape sequence, i.e., a character string which is interpreted by the data adapter to be a command to shift from a transmission state back to a command state. Thereafter, the application program gives the data adapter the command "ATH", in which the AT indicates that it is a command, and the H is an abbreviation of the term "hang-up", i.e., "end". Controller block 29 of the data adapter conveys the command to the mobile phone in the same way as described above in connection with the number selection command, and the telephone ends communication.

Figure 9:
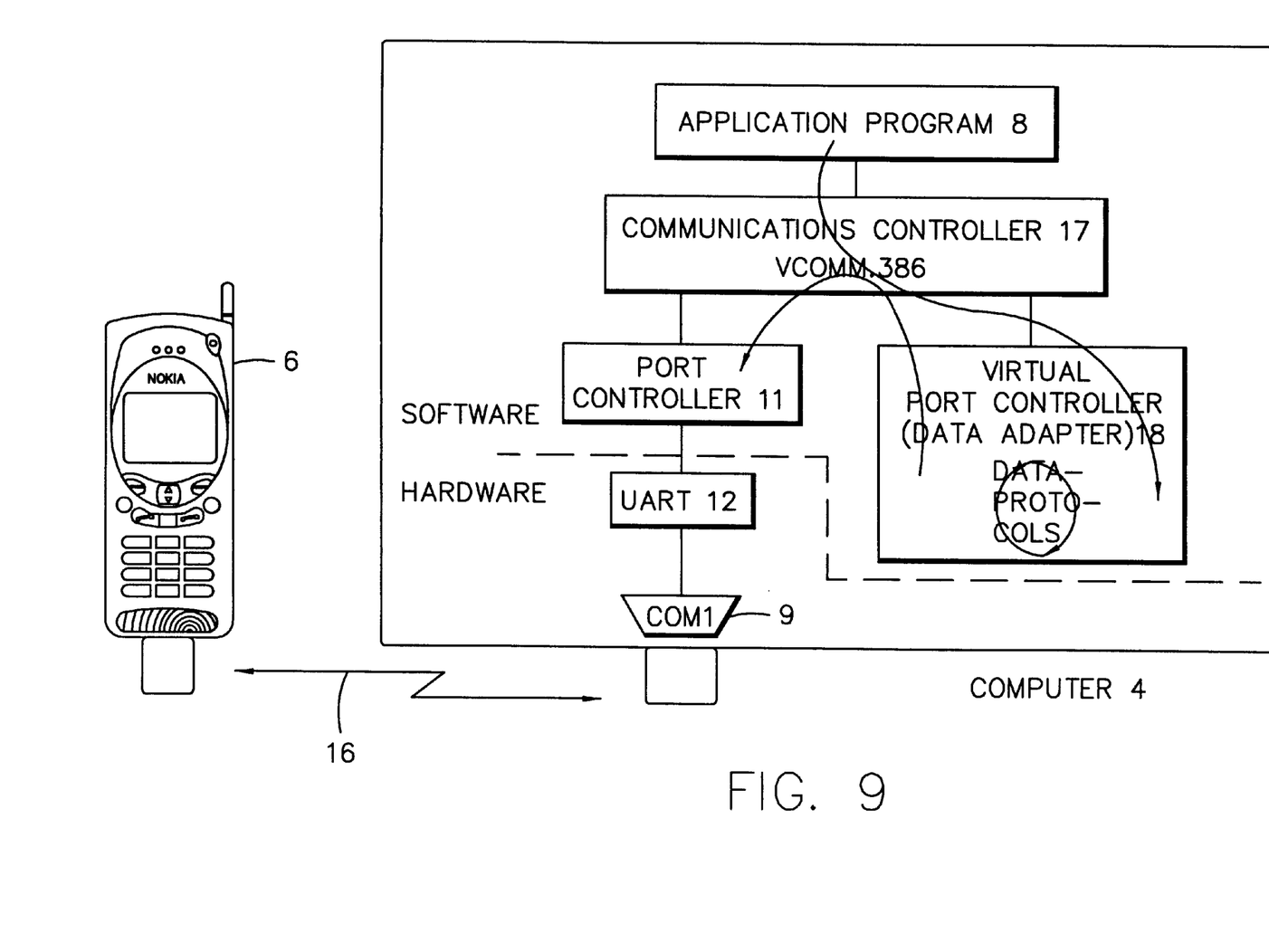
FIG. 9 illustrates the travel of the transmitted data in a computer using the data adapter according to the invention when the invention is implemented by using an advantageous embodiment.

FIG. 9 illustrates the above-described transfer of the transmitted data in computer 4, in which data adapter 18 according to the invention is installed. In the case of FIG. 9, data adapter 18 according to the invention is implemented by a preferred embodiment entirely on a software basis with application program 8, communications controller 17, and port controller 11, whereby they belong to the software part of the computer, separated by the dashed line. In FIG. 9. transmission link 16 between computer 4 and mobile phone 6 is implemented as a cordless connection, preferably as an infrared link.

In the following a case is described in which the data adapter is used as a part of hardware which receives data through a digital mobile communications network. This case is not illustrated in the figures separately but it is essentially the same as the above-described case of data transmission. However, the functions are effected in reverse order. When mobile phone 6 receives a call message indicating an incoming call, it informs data adapter 7, 18 of the call. This indication is a character string, as was the start signal of the call described above, and its detailed implementation depends on the manufacturer of the mobile phone and, therefore, is not essential with respect to the data adapter as long as it is known by the manufacturer of the data adapter. A difference between the prior art and the invention is again a transmission route which comprises, in the solutions according to prior art, a port physically situated in a modem or data adapter. In the solution according to the invention, the message comes directly from mobile phone 6 to serial port 9 of the terminal, and from there via port controller 11*a* and communications controller 17 to data adapter 18. Data adapter 18 informs application program 8 of the arrival of the call via its standardized interface 28 by providing repeated messages, i.e., so-called ring-messages to the application program. When a decision on answering the call is made in the application program, the software provides AT command "ATA", i.e., AT -answer, to the data adapter that is in the command state. Control block 29 of data adapter 18 commands mobile phone 6 to answer the call, and when the connection is in order, the mobile phone transmits an OK message to the data adapter, and data adapter 18 conveys the message to application program 8 via call interface 28. Thereafter, the data adapter shifts into the transmission state and starts receiving data from the mobile phone.

The digital signal processor (not shown in the figures) of the mobile phone carries out, on the received signal, a channel decoding and deinterleaving according to the GSM standard, so that the data is in the same RLP frame form in which it left the data adapter of the sender. The frames are transferred to data adapter 18 whose data protocol block 22 releases the frame structure. In a data adapter intended for the GSM system in which the data protocol block 22 comprises L2R and RLP subblocks, RLP block 24 releases one RLP frame at a time and checks on the basis of a checksum, whether the received frame is flawless. If the checksum does not correspond to the other contents of the frame, the RLP block transmits an error message which travels along the transmission link backwards with respect to the direction of data transmission up to the data adapter of the sender. The error message contains the information required to identify the defectively received frame, and the transmitting data adapter reacts to the message in accordance with the transmission protocol used, which typically means that the faulty frame is transmitted again or the entire transmission is restarted from the faulty frame onwards.

After RLP block 24 has interpreted that the release RLP frame was received correctly, it transfers the protocol unit, i.e., the PDU released from the frame to L2R block 23 where it is further released into a form understood by the application program. Thereafter, the data is transferred to application program 8. In the arrangement according to the invention the latter data transmission is again a communication between the program processes of the computer, and the practical implementation thereof depends on the structure and capacity of the processor of the computer. This differs from prior art because in the known solutions the data is transferred from data adapter 7 to application program 8 along the data bus of the terminal from one circuit to another.

Transferring a telefax through a digital communications network by using the data adapter differs slightly from the data transmission described above; consequently, telefax transmission and reception are dealt with in the following in more detail with reference generally to FIGS. 7*c* and 7*d*. In telefax transmission, a larger number of AT commands are needed compared to the transmission described above. Therefore, data adapter 7, 18 suitable for the GSM system comprises a standardized expansion 25 of the AT command interpreter which is called a PC telefax protocol. The additional commands involve the selection of the parameters, such as resolution, related to the telefax transmission, and whether error correction is used in the transmission. GSM standards GSM 03.45 and 03.46 determine the so-called transparent and non-transparent framing of telefax data, of which the former means that error correction is not used and the latter that error correction is used. In the transparent processing, telefax data is not processed in the above-described L2R and RLP blocks but only a speed adjustment 26 is effected on it, which corresponds to the capacity of the telefax equipment participating in the transmission. In the non-transparent processing framing is effected on the telefax data in the data protocol block (L2R 23 and RLP 24) in a similar way as in the transmission described above. Application program 8 selects a transparent or non-transparent process by transmitting, in the initial stage of the transmission, a corresponding AT command to data adapter 7, 18. In practice, the difference between the processes is perceivable in that in the transparent transmission the transmission delay between the transmitting and the receiving terminals is constant but the error ratio, i.e., the ratio of the number of bits defectively received to the entire number of bits of the data varies according to the load and the linking circumstances of the network. In the non-transparent transmission the error ratio is constant but the delay varies.

Starting and ending a telefax call is effected in the same way as described above in connection with the data transmission. A special feature of the telefax transmission is that the application program determines, by using the AT commands included in the PC telefax protocol, the functions related to the telefax transmission which differ from the data transmission, an example of which is the above-described selection between the transparent and non-transparent framing. The use of data adapter 18 according to the invention in telefax transmission differs from prior art in a similar way as the use in data transmission, i.e., the communication between application program 8 and data adapter 18 according to the invention is effected via communications controller 17 between the program-specific processes of the computer, and the data transmission between data adapter 18 and mobile phone 6 is similarly effected via communications controller 17 by using the ordinary serial port 9 of the computer and its port controller 11*a*.

In data adapter 18 according to the invention, expansion 25 of the AT command interpreter and different telefax protocols (the transparent and non-transparent framing) required for the telefax data transmission are included in the data protocols. Instructions on the implementation of these data protocols are recorded in electric form in the memory of the terminal as a part of the data adapter according to the invention.

Several points in the description above refer to communications controller 17 which controls data transmission in the arrangement according to the invention between application program 8 and data adapter 18 and between data adapter 18 and port controller 11*a* which controls the physical port. One reason why manufacturing of data adapter arrangements similar to that of the invention have not been possible before is that in computers the data transmission between the processor and the port controller that controls the physical port are controlled by arrangements, such as the COMM (COMmunication Manager) included in the Windows 3.1 operating system, that have been very inflexible. According to the traditional system, a computer comprises a certain number of physical ports to transfer data in serial form from the processor to the modem or to the data adapter or other peripherals. In PCs these ports are called COM-ports and they are numbered COM1, COM2, etc. In the prior art, modem 1, 5, 10 or data adapter 7 installed in the computer are determined, i.e., configured, in the installation stage, to be perceived by the processor controlled by application program 8 as a certain serial port, such as COM1. The attempts of any other application programs than those using a modem or data adapter to use the port in question after this, the COM1 in the example, have caused an error state.

In new operating systems, of which the Microsoft Windows95 operating system is handled here as an example, a different communications controller 17 is used which offers a standardized interface for all devices and processes that handle data transmission. It also provides an opportunity to implement the so-called virtualization of device controllers. In Windows95 this communications controller 17 is called VCOMM. The standardization of interface 28 means that the said new type of communications controller, such as VCOMM, comprises predefined given acceptable device controller types 11, such as print and serial port controllers, calls, commands, and means for transferring data between the application program and device controllers 11 which represent said standard types, comprising, e.g., in the case of the serial port controller, the opening and closing of the port as well as the setting of the transmission rate.

When a new device controller 11, 11a, 18 is installed in a computer which uses a communications controller 17 similar to the above-mentioned VCOMM, the new device controller preferably being a device controller program which uses serial mode data transmission between the computer and some other device, it is registered under communications controller 17 and is provided with serial port number COMx in which the x can be between 1–255. Data adapter 18 according to the invention and port controllers 11, 11a which control the physical communication ports 9, COM2, LPT1 of the computer are such device controllers. Because data adapter 18 according to the invention does not directly control any physical port, it is called a virtual port controller in the system. When data adapter 18 according to the invention is installed in a system using an operating system such as Windows95, it is registered as a serial port controller below communications controller 17 and is provided with a serial port number. In addition to this, information is recorded during the installation in data adapter 18 according to the invention, indicating the number of the physical serial port to which the mobile phone 6 used in the data transmission is connected. This physical serial port (COM in FIG. 8) is controlled by its port controller (11a in FIG. 8) which is known per se and contains information indicating the address of the memory space in which the UART circuit 12 of the desired port is and which interrupt signal it uses.

Communications controller 17 (e.g., VCOMM) controls the data transmission now so that when application program 8 transmits an AT command or a data word intended for the transmission, communications controller 17 directs it to data adapter 18 according to the invention. Data adapter 18, in turn, calls physical port 9, i.e., when the data adapters wants to transmit a command or an RLP frame to mobile phone 6, it transfers it to communications controller 17 which further directs it to port controller 11a controlling physical port 9, and through there to mobile phone 6 with the aid of physical port 9 and data transmission cable 16. In the reception, the data from mobile phone 6 comes via cable 16 and physical port 9 to port controller 11a which calls data adapter 18 according to the invention, i.e., transmits the data through communications controller 17 to data adapter 18 from where it is transmitted again via communications controller of the serial 17 to application program 8. Due to the communications controller of the VCOMM type and the arrangement described above, the application program does not need to know which numbers of device controllers participating in the serial communications are specified in the system because the communications controller in each case ensures that data is transmitted to the correct port controller or other device controller which can be a real port controller like port controller 11a of the physical serial port, or a virtual port controller similar to data adapter 18 according to the invention.

The description presents, by way of example, physical link 16 between the terminal, i.e., the computer and the mobile phone as a data transmission cable. It can also comprise an infrared link or other data transmission link, as shown in FIG. 9. With respect to the applicability of the invention it is essential that the data transmission link is implemented by using a physical port according to the standard, such as RS-232 serial port which already exists in the computer. In this way, the use of data adapter 18 according to the invention does not require the installation of additional components in the part of the computer through which it communicates with peripherals similar to the mobile phone.

Communications controller 17 (e.g., VCOMM) is a program included in the operating system (e.g., Windows95) of the computer, controlling all the traffic inside the computer. The port controllers and other device controllers are automatically registered (or not registered until they are needed) in the communications controller when the computer is started. This function is called "Plug and Play". After the registration the application programs have access to the real or virtual communication ports controlled by the device controllers. When a port controller, such as data adapter 18 according to the invention, controlling a virtual communication port is made, it is made on standardized interface 28 under communications controller 17, whereby the level hierarchy of the system remains the same.

Figure 7B:
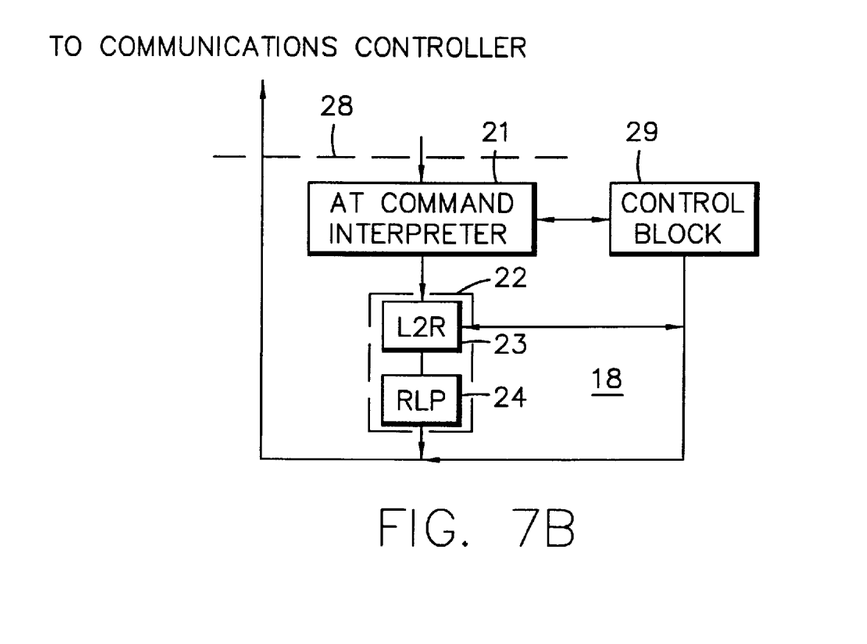
FIG. 7b presents a block diagram of the operation of the data adapter according to the invention in data transmission.
Figure 7C:
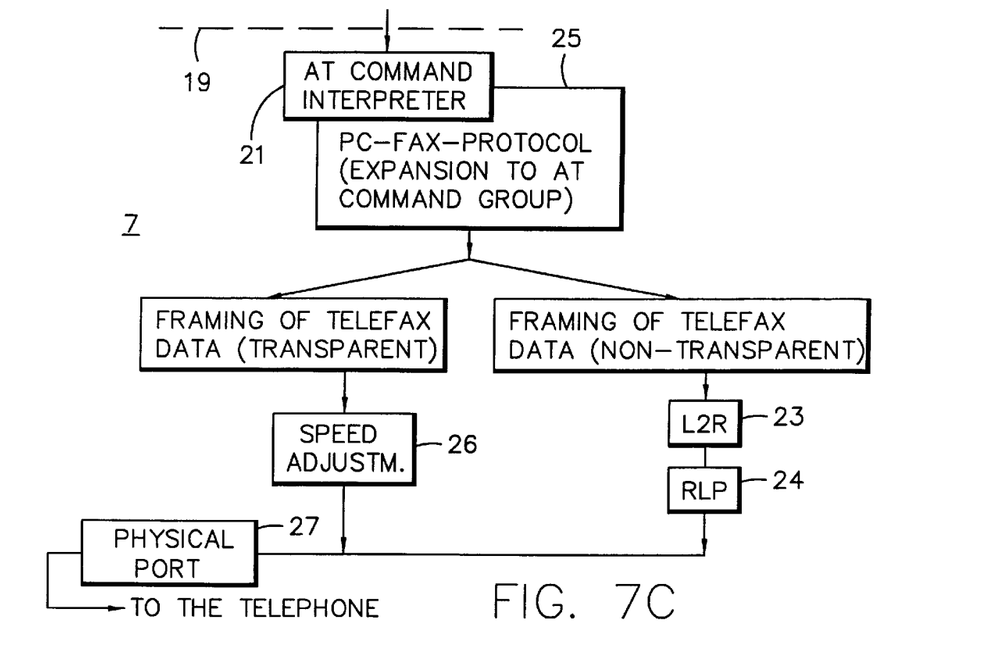
FIG. 7c presents a block diagram of the operation of the known modem or data adapter in telefax transmission.
Figure 7D:
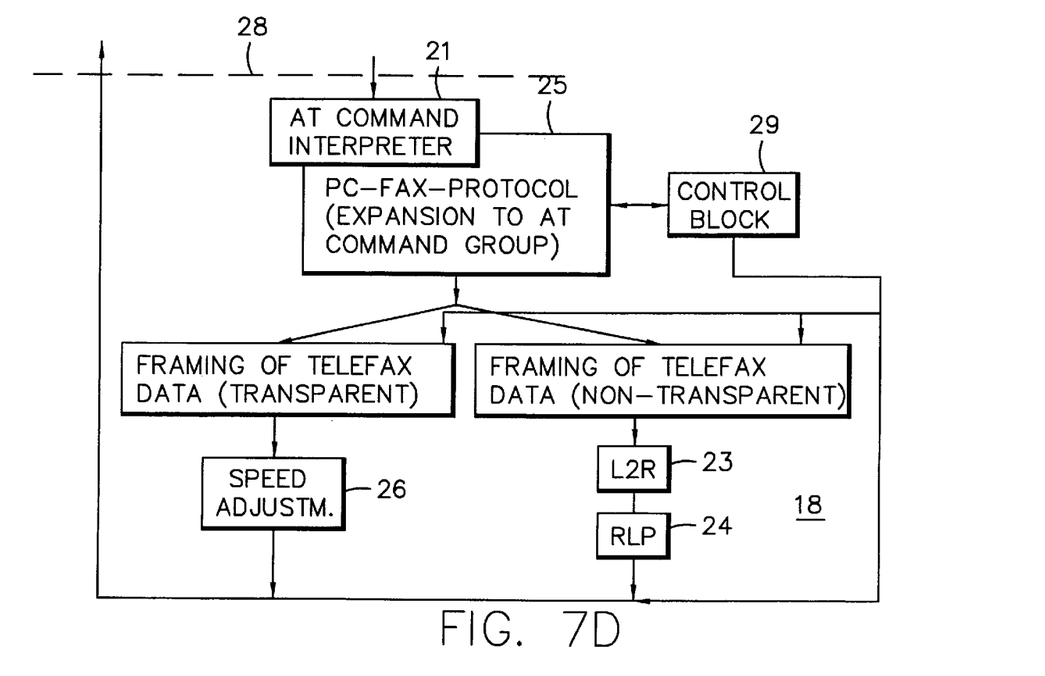
FIG. 7d presents a block diagram of the operation of the data adapter according to the invention in telefax transmission.

An especially advantageous embodiment of the invention is to implement all the blocks in FIGS. 7b and 7d related to the invention by programming the commands corresponding to their performance in the memory of the computer, whereby no extra devices or components need to be installed in the computer. With respect to the functioning, these blocks correspond to the blocks marked with the same reference numbers in data adapter 7 according to prior art, shown in FIGS. 7a and 7c, so they are known per se by those skilled in the art.

The data adapter of the invention can also be used in other than the traditional data applications (terminal communication, data transmission, telefax). In one preferred embodiment the data adapter processes digital speech signals coming from the telephone and effects on them the required signal processing tasks, such as modification or compression of the sampling rate. In this way, the speech signal is easy to transmit from the telephone to the computer and vice versa, which makes it possible to implement, e.g., a telephone answering machine by using the data terminal without additional electronics.

In FIGS. 7a–7d and in the description above, the names belonging to the GSM system have been used, by way of example, for the parts and functions of the data adapter according to the invention. By replacing these parts with corresponding parts according to other mobile phone systems, the data adapter according to the invention can be applied to be used in other systems. For instance, by replacing data protocol block 22 consisting of the L2R- and RLP-blocks with a protocol block according to the WORM-ARQ standard, the data adapter can be conformed to the corresponding Japanese mobile phone system. In contrast, a data adapter applied to the American telefax transmission according to standard IS 136 does not include a PC-telefax expansion or transparent telefax framing, but only a compression according to the V.42 bis standard and an RLP framing. This corresponds to telefax transmission according to class 2.0 of the GSM system. The corresponding AT command interpreter is adapted to transmit all the other than the AT commands intended for the flow control between the computer and the mobile phone through the communications controller, the port controller, the physical port and the mobile phone to the mobile switching centre.

As described above, the implementation of the data adapter according to the invention does not necessarily require separate electronic devices or components to be installed in the computer. In this way, the disadvantages of traditional modems and data adapters caused by differences in manufacture and standardization are avoided. The data adapter can be installed in all computers whose processors and operating systems are efficient enough independent of whether there are free card slots in the computer. The solution according to the invention is extremely simple and reliable. The computer can be used any time to modify any of its settings and it can be configured for different uses. As data transmission protocols develop to process, e.g., the transmission of multimedia data, the data adapter according to the invention is easy to update and expand: the user only has to run an installation program in his/her computer, installing, the new features of the data adapter. The manufacturing costs of the data adapter according to the invention are considerably lower than those of traditional modems or data adapters.

What is claimed is:

1. A method for transmitting data between a data terminal and an external device coupled thereto, the data terminal comprising:

an application program for controlling the operation of the data terminal and processing the transmitted data, a communications controller for controlling the internal data transfer of the data terminal, and at least one communication port, and a port controller controlling said at least one communication port, for transmitting data between said data terminal and said external device, in which method the transmitted data is processed in the application program and directed through the port controller and the communication port, wherein the improvement comprises the steps of:

carrying out a predefined modification of the transmitted data between the form of data processed by said application program and the form of data processed by said external device in a device controller using processing software installed internally in the data terminal, and implementing the data transmission by coupling said device controller with said application program through said communications controller.

2. A method according to claim 1, wherein transmitted data is formed in said application program, directed through said communications controller to said device controller, software processed in said device controller into a form processed by said external device, and directed through said communications controller to said port controller to be transmitted to said external device.

3. A method according to claim 1, wherein transmitted data is transmitted from said external device to said port controller, directed from there through said communications controller to said device controller, software processed in said device controller into a form processed by said application program, and directed through said communications controller to said application program.

4. A method according to claim 1, comprising the further step of providing a memory in the data terminal and wherein the arrangement for carrying out the method is recorded in electric form in the memory of the data terminal.

5. A method according to claim 1, wherein said application program controls the operation of said device controller by providing said device controller with AT commands.

6. A method according to claim 1, wherein said device controller applies a framing arrangement according to GSM standards 07.02 and 04.22 in software processing the transmitted data.

7. A method according to claim 1, wherein said device controller applies a framing arrangement according to the WORM_ARQ standards in software processing the transmitted data.

8. A method according to claim 1, wherein said device controller applies a framing arrangement according to the IS136 data communications standard in software processing the transmitted data.

9. A method according to claim 1, wherein said device controller applies a framing arrangement according to the IS95 data communications standard in software processing the transmitted data.

10. A data terminal comprising, for transmitting data between the data terminal and an external device coupled thereto, an application program for controlling the operation of the data terminal and processing the transmitted data, a communications controller for controlling the internal data transfer of the data terminal, and at least one communication port and a port controller controlling said at least one communication port for transmitting data between said data terminal and said external device, wherein the improvement comprises:

means for software processing the transmitted data into a first form of data processed by said application program and a second form of data processed by said external device, said software processing means comprising:

a device controller internal to the data terminal and coupled to said communications controller for transmitting data processed in said device controller, between said device controller and said application program, and between said device controller and said port controller.

11. A data terminal according to claim 10, wherein said device controller comprises software comprising:

an interpreting part for interpreting the incoming commands in said transmitted data, and means for modifying the data between the form of data processed by said application program and the form of data processed by said external device.

12. A data terminal according to claim 10, further comprising a memory in the data terminal, and wherein said device controller is recorded in electric form in the memory of said data terminal.

13. A data terminal according to claims 10, wherein said data terminal uses the Microsoft Windows95 operating system, and said communications controller is a VCOMM communications controller which belongs to said operating system.

14. A data terminal according to claim 10, wherein said communication port is a serial communication port according to standard RS-232.

15. A data terminal according to claim 10, wherein said communication port is an infrared link.

16. A device controller in a data terminal for processing data transmitted between an application program controlling the operation of the data terminal and an external device coupled to the data terminal, the data terminal comprising:

a communications controller for controlling the internal data transfer of said data terminal, and at least one communication port, and a port controller that controls said at least one communication port, for transmitting data between said data terminal and said external device, and wherein the improvement comprises:

said device controller software processes the data internally transferred into the form of data processed by said application program and the form of data processed by said external device, and is coupled to said communications controller for transmitting data between said device controller and said application program.

17. A device controller according to claim 16, further comprising:

an interpreting part for interpreting the incoming commands in said transmitted data, and means for modifying the data between the form of data processed by said application program and the form of data processed by said external device.

18. A device controller according to claim 16, further comprising a memory in the data terminal, and wherein said device controller is recorded in electric form in the memory of said data terminal.

19. A device controller according to claim 16, wherein said communication port is an infrared link.

20. A data terminal according to claim 16, wherein said communication port is a serial communication port according to standard RS-232.

* * * * *